N. C. BASSETT.
BALANCING MACHINE.
APPLICATION FILED JAN. 19, 1907.
923,401.
Patented June 1, 1909.
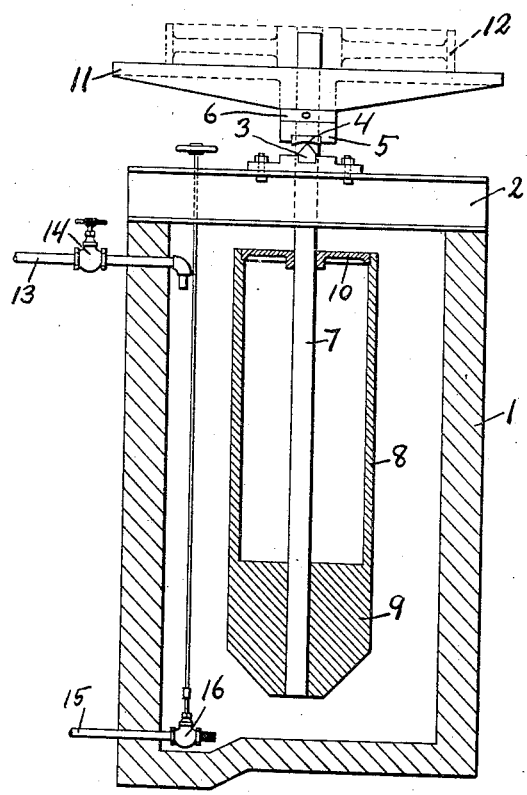
Fig. I.
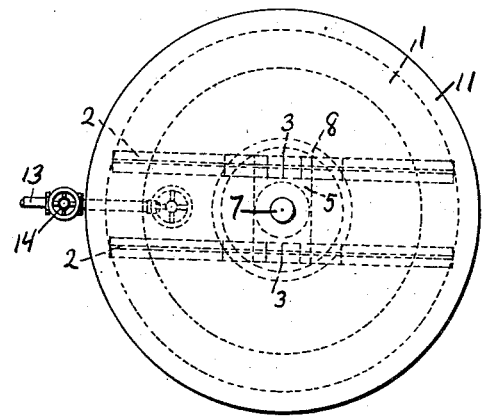
Fig. II.
WITNESSES:
Frank E. Dennett
John C. Rennie
N. C. Bassett INVENTOR
BY
ATTORNEY.

UNITED STATES PATENT OFFICE.

NORMAN C. BASSETT, OF MILWAUKEE, WISCONSIN, ASSIGNOR TO ALLIS-CHALMERS COMPANY, OF MILWAUKEE, WISCONSIN, A CORPORATION OF NEW JERSEY.

BALANCING-MACHINE.

No. 923,401.
Specification of Letters Patent.
Patented June 1, 1909.

Application filed January 19, 1907. Serial No. 353,033.

*To all whom it may concern:*

Be it known that I, NORMAN C. BASSETT, a citizen of the United States, residing at Milwaukee, in the county of Milwaukee and State of Wisconsin, have invented a certain new and useful Balancing-Machine, of which the following is a specification.

This invention relates to balancing machines or that class of machines by which the heavy or light side of an object with reference to some axis may be readily and accurately determined.

This invention comprises generally a support for the object the balance of which is to be ascertained, means for sustaining said support, and means for rendering said support more or less stable at will.

In the drawings which accompany this specification and form a part thereof, and on which the same reference characters are used to designate the same elements wherever they may appear in each of the several views,—Figure 1 represents a vertical section through an apparatus embodying this invention. Fig. 2 represents a plan view of the apparatus shown by Fig. 1.

Referring to the drawings, the numeral 1 designates a tank or any suitable receptacle adapted to contain a fluid, and supported either above or upon this receptacle, as may be convenient according to the location where the apparatus is to be used, are supporting means consisting, in the example shown, of two I-beams 2, supported by said tank and spaced somewhat apart. Upon these I-beams are supported the knife edge bearings 3, upon which rest the hardened V's 4, the arrangement being similar to ordinary forms of bearings for weighing scales. The V's 4 may form a part of or be secured to the cross member 5, upon which the collar 6 is adapted to rest; the collar 6 being secured to and supporting a pendulous shaft 7, to which is secured a weighted tank or box 8, including a weight 9, which, as shown by Fig. 1 of the drawings, may be formed in a single casting cast upon the shaft 7, a cover 10 being provided for the unweighted end of the box. The shaft 7 extends upwardly through the collar 6, and upon this projecting end is mounted the rotatable turntable 11, upon which the object the balance of which is to be ascertained, as, for example, a pulley 12, is placed.
The numeral 13 designates a pipe controlled by the cock 14, through which fluid, as water, for example, may be admitted to the interior of tank 1; and the numeral 15 designates a pipe controlled by the cock 16, by which said fluid may be permitted to escape, or may be withdrawn from the interior of tank 1.

The operation of the apparatus is very simple and is as follows: A body, as the pulley 12, for instance, being placed upon the turntable, if one side of the pulley is heavier than the other, that side of the turntable will be tipped down to a certain extent dependent upon the excess of weight of that side of the pulley and the distance of the center of gravity of its mass from the axis of shaft 7 and the weight 9. If the object placed upon the turntable produces no appreciable tipping of the table, water may be admitted through pipe 13 into the tank 1, and the height of the water in said tank may be varied so that more or less of the effect of the weight 9 in maintaining the turntable stable may be neutralized, the amount of stability thus lost being of course equal to the volume of water displaced multiplied by the distance of its center of volume from the knife edges 3; or the water may be allowed to fill the tank so full that with a properly proportioned apparatus the turntable, pulley, etc., will be floating free and will no longer bear down upon the knife edges 3, with the result that the apparatus has become unstable to an extent which now depends merely upon the unsymmetrical distribution of weight upon the turntable with relation to the ballasting effect of the weight 9 of the vessel or box 8.

It will be understood that the turntable may be revoluble about shaft 7 or be secured thereto and revolve therewith, the shaft and turntable being supported upon the cross member 5 by means of the collar 6, or directly by the turntable itself, the collar 6 being omitted.

What I claim is,—

1. The combination with a receptacle adapted to contain a liquid, of a turntable without said receptacle, a support for said turntable and with respect to which the turntable is free to tip, a weight secured to said turntable and adapted to retain it normally in a predetermined position, said weight being located in said receptacle.

2. The combination with a receptacle adapted to contain a liquid, of a turntable, a support for said turntable and with respect to which the turntable is free to tip, a weight secured to said turntable and adapted to retain it normally in a predetermined position, said weight being located in said receptacle, and means to supply a fluid to and withdraw it from said receptacle.

3. The combination with a receptacle adapted to contain a liquid, of a turntable, a support for said turntable and with respect to which the turntable is free to tip, a weighted tank secured to said turntable and adapted to retain it normally in a predetermined position, said weighted tank being located in said receptacle.

4. The combination with a receptacle adapted to contain a liquid, of a turntable, a support for said turntable and with respect to which the turntable is free to tip, a weighted tank secured to said turntable and adapted to retain it normally in a predetermined position, said weighted tank being located in said receptacle, and means to supply a fluid to and withdraw it from said receptacle.

In testimony whereof, I affix my signature in the presence of two witnesses.

NORMAN C. BASSETT.

Witnesses:
FRANK E. DENNETT,
H. C. CASE.